(12) United States Patent
Numata et al.

(10) Patent No.: US 6,931,525 B2
(45) Date of Patent: Aug. 16, 2005

(54) METHOD FOR SWITCHING BETWEEN BOOT DEVICES IN INFORMATION PROCESSING UNIT

(75) Inventors: Kifumi Numata, Yokohama (JP); Kazunobu Umeda, Machida (JP); Yohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/054,529

(22) Filed: Jan. 22, 2002

(65) Prior Publication Data

US 2002/0120836 A1 Aug. 29, 2002

(30) Foreign Application Priority Data

Jan. 31, 2001 (JP) ........................................ 2001-022655

(51) Int. Cl.[7] ................................................. G06F 1/24
(52) U.S. Cl. ............................. 713/100; 713/1; 713/2; 710/10; 714/36
(58) Field of Search ............................. 710/10; 714/36; 713/1, 2, 100

(56) References Cited

U.S. PATENT DOCUMENTS 5,249,224 A * 9/1993 Chambers .................. 379/398
5,987,605 A * 11/1999 Hill et al. ...................... 713/2
6,446,203 B1 * 9/2002 Aguilar et al. ................ 713/2
6,553,490 B1 * 4/2003 Kottapurath et al. .......... 713/2
6,754,818 B1 * 6/2004 Lee et al. ...................... 713/2

FOREIGN PATENT DOCUMENTS

| JP | 62-187936 | 2/1986 | ............. G06F/9/06 |
| JP | 08-339295 | 6/1995 | ............. G06F/9/06 |
| JP | 2000-020285 | 6/1998 | ............. G06F/9/06 |

* cited by examiner

*Primary Examiner*—Rehana Perveen
(74) *Attorney, Agent, or Firm*—Sawyer Law Group LLP (57) ABSTRACT

A method for switching between boot devices in an information processing unit devoid of a human machine interface for inputting, the steps of short-circuiting an output port and an input port, outputting a verification signal from the output port at the time of powering on or restarting the information processing unit, determining whether or not the verification signal is input to the input port, switching the OS boot source to a second boot device if the verification signal is input to the input port, and switching the OS boot source to a first boot device if the verification signal is not input to the input port, is provided for.

17 Claims, 7 Drawing Sheets

DEDICATED PLUG INTERNAL INTERCONNECTIONS

METHOD FOR SWITCHING BETWEEN BOOT DEVICES IN INFORMATION PROCESSING UNIT

FIELD OF THE INVENTION

The present invention relates to a method for switching between boot devices when booting an OS (Operating System) in an information processing unit, and more specifically, to a method for switching between boot devices when booting an OS from a different boot device for the purpose of upgrading the OS and/or checking in an information processing unit which is not equipped with any human machine interface for inputting, such as a keyboard.

BACKGROUND ART

When a typical information processing unit is turned on or restarted, BIOS (Basic Input/Output System) software stored in a ROM (Read Only Memory) provided on a main board or the like is used to boot an operating system (OS) from predetermined storage.

It is known that various information processing units, such as a personal computer for example, are provided with a human machine interface for inputting information via an input device, such as a keyboard, through which a user can input commands or instructions.

For the situation when a fault is discovered in the OS in the information processing unit having an input device, such that an OS is to be booted from another storage source, the unit is first powered on again while a predetermined key (such as the "Delete" key) is pressed on the keyboard, so that the OS can be read from a medium other than the predetermined storage (such as a CD).

In other situations, it is known that some information processing units, such as those typically in an automated production line or in a network, are devoid of both human machine interfaces and input devices. Often, one reason for the absence of such input interfaces and input devices in an information processing unit (also used hereinafter interchangeably as a "computer" or "computing device") is to prevent the presence of dust and/or erroneous input to the computing device. Other reasons for the absence of such input interfaces and device may also include that the computer is isolated from users, the computer is not intended for user input, and/or input and output instructions are remotely communicated to the computer over a network. However, even in this situation, the computer may encounter OS related faults or may require upgrading, such that there is a need to boot an OS from a storage source different than that of the primary storage.

Unfortunately, without an input device or input interface, the information processing unit described above is unable to switch the boot device to boot an OS from a different storage source by simply "powering on while pressing a predetermined key on the keyboard".

Although a different OS could be set up for coping with faults in an OS or upgrading the first OS version, and a storage dedicated to the different OS could be additionally provided to the information processing unit, such a result is economically disadvantageous as costs for the end unit rise substantially. Furthermore, since the information processing unit described above may possibly be used with no user in proximity to the unit, storing an OS in the storage could make the OS susceptible to alteration and vulnerable in terms of security management, since the stored OS would also be capable of performing special operations for recovering from a fault and/or upgrading the OS.

Therefore, it is not desirable to provide a different OS with an information processing unit devoid of an input device along with a switch for allowing switching between a normal boot device and a special boot device for upgrading an OS version, even though the provision of a different OS may be well-intended for handling faults and/or upgrade activities as the resulting risks are unacceptable.

Another consideration for overcoming the above identified limitations involving a conventional information processing unit devoid of an input device, includes utilizing a different OS stored in a note type personal computer (hereinafter referred to as "note type PC", "note PC", and "notebook computer") having a keyboard, wherein the note type PC is connected through a connector to the information processing unit to boot the different OS for coping with the previously identified faults and/or upgrading.

However, for such a situation, it is known that a note type PC, or similar, is a precision device often having a liquid crystal display and should be handled with care. Further to use the note type PC, the portable device must be carried to a location for each fault occurrence and/or upgrading activity. Therefore, the note type PC could be damaged in transit, in operation and/or be subject to environmental hazards at a site. Additionally, an operator coping with faults or upgrading would also need to carry a PC having a typical weight of a few kilograms thereby adding to the operator's workload.

Additionally, in a further scenario, where a general purpose note type PC were to be used to boot a different OS for coping with faults or upgrading activity, an security management qualified operator should be used to prevent a possible compromise to the level of security management could degrade. As a result, the use of such qualified personnel would also add to costs of operation of such a situation which is less than desired.

SUMMARY OF THE INVENTION

Accordingly, there is a need for a method for switching between boot devices in an information processing unit devoid of an input device to alleviate the workload of a maintenance worker in switching between the boot devices for booting a different OS while achieving strict security management.

According to an embodiment of the present invention, a method for switching between a plurality of boot devices in an information processing unit provided with an external device connector including at least one output port and at least one input port, in which an operating system (OS) is booted from a first boot device for normal operation or is booted from a second boot device for a special operation, said method comprising the steps of: outputting a verification signal from said output port at the time of powering on or restarting said information processing unit; determining whether or not said verification signal is input to said input port; switching an OS boot source to said second boot device when said verification signal is input to said input port; and switching the OS boot source to said first boot device when said verification signal is not input to said input port, is provided.

According to another embodiment of the present invention, a method for switching between boot devices in an information processing unit, comprising a plug attachable to an external device connector provided in the information processing unit and having a plurality of input/output pins is used as a key device for determining whether to boot an OS from a first boot device for a normal operation or from a second boot device for a special operation at the time of power on, wherein the OS boot source is switched from the first boot device to the second boot device by directly connecting at least one output of said plug with at least one input thereof, is provided for.

PREFERRED EMBODIMENTS OF THE INVENTION

The present invention will be now described with reference to the embodiments shown in the drawings.

Figure 1:
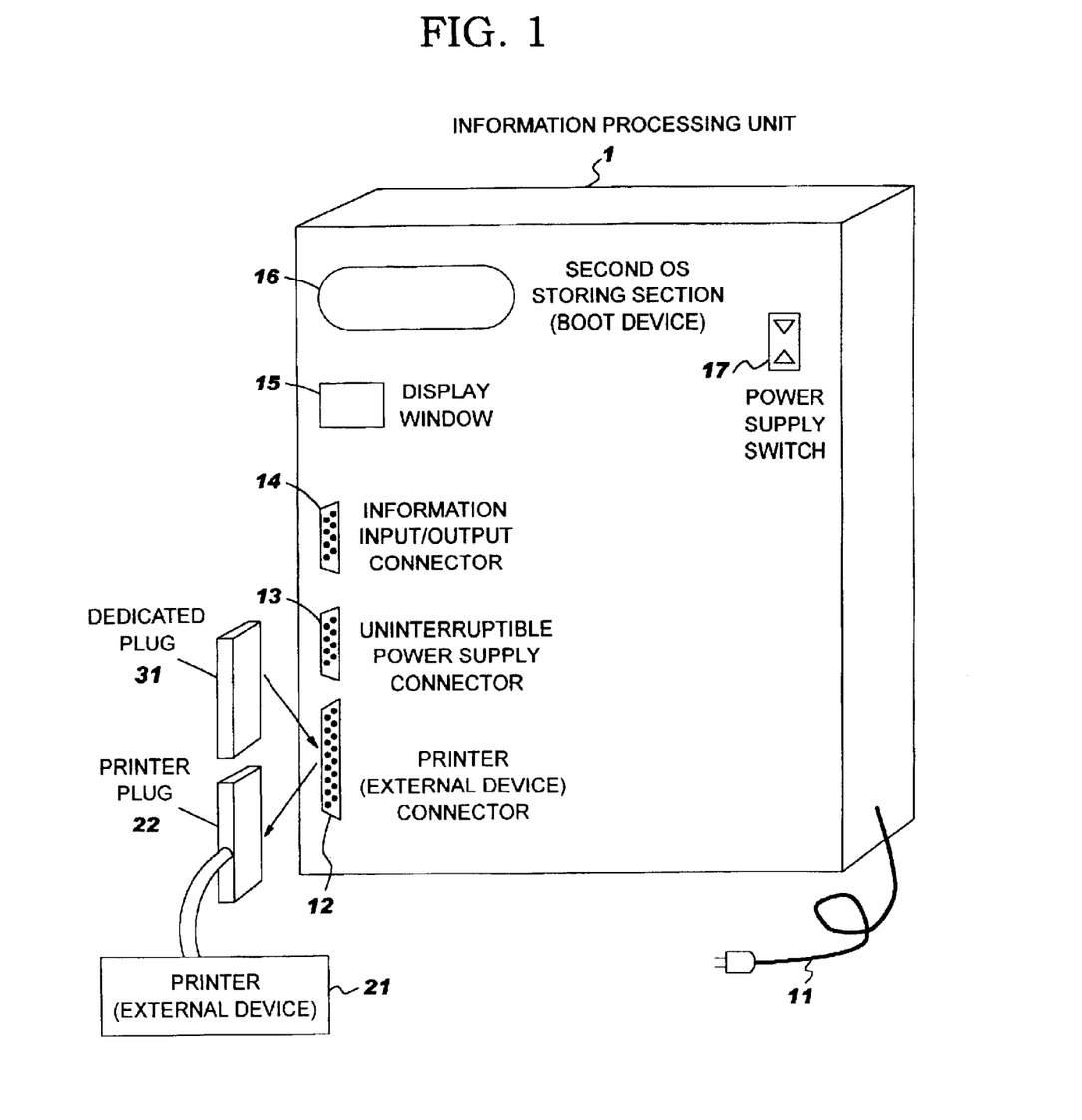
FIG. 1 is a block diagram of the external structure of an information processing unit according to a first embodiment of the present invention.

FIG. 1 is a block diagram of the external structure of an information processing unit according to a first embodiment of the present invention.

The information processing unit 1 shown in FIG. 1 is an apparatus, for example, connected to the Internet to store a large number of unspecified data pieces, which includes a power supply cord 11 for connection with a commercial power, a printer connector 12 for connection with a printer 21, which is an external device, an uninterruptible power supply connector 13 for connection with an uninterruptible power supply connected for power supply backup in case of power failure, an information input/output connector 14 for connection with another information processing unit or an information input/output device, a display window 15 capable of displaying several digits, a second OS storing section 16 integrated in the main body of the information processing unit 1, serving as a boot device storing a second OS used at the time of special processing and capable of reading out data from a portable recording medium such as a floppy disk, and a power supply switch 17 turning on/off the power supply of the information input/output device.

Figure 3:
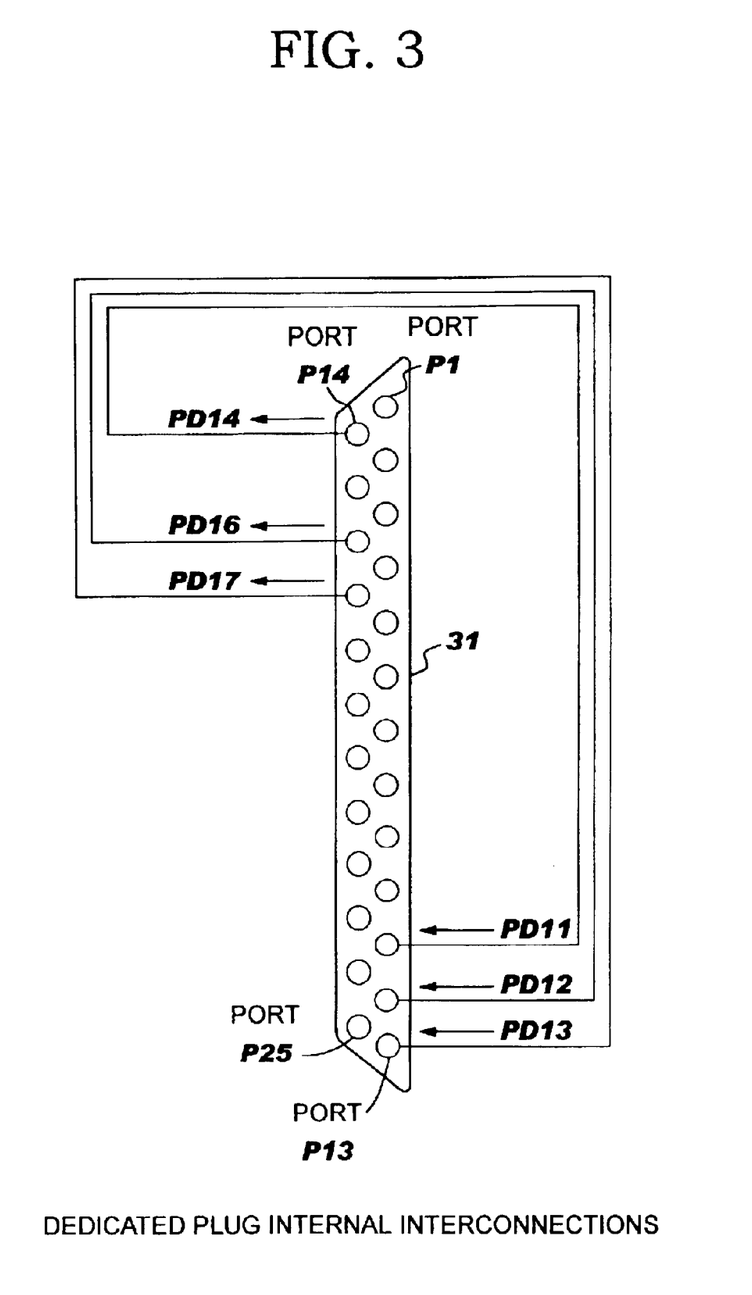
FIG. 3 is a diagram of an example of internal wiring or interconnections in the dedicated plug 31 referenced in FIG. 1.

The printer connector 12 is normally connected by a printer plug 22 with the printer 21 which is an external device. When a special operation such as upgrading an OS (also known as "versioning up") is performed, a dedicated plug 31, which will be described in conjunction with FIG. 3, is connected to the printer connector 12.

Figure 2:
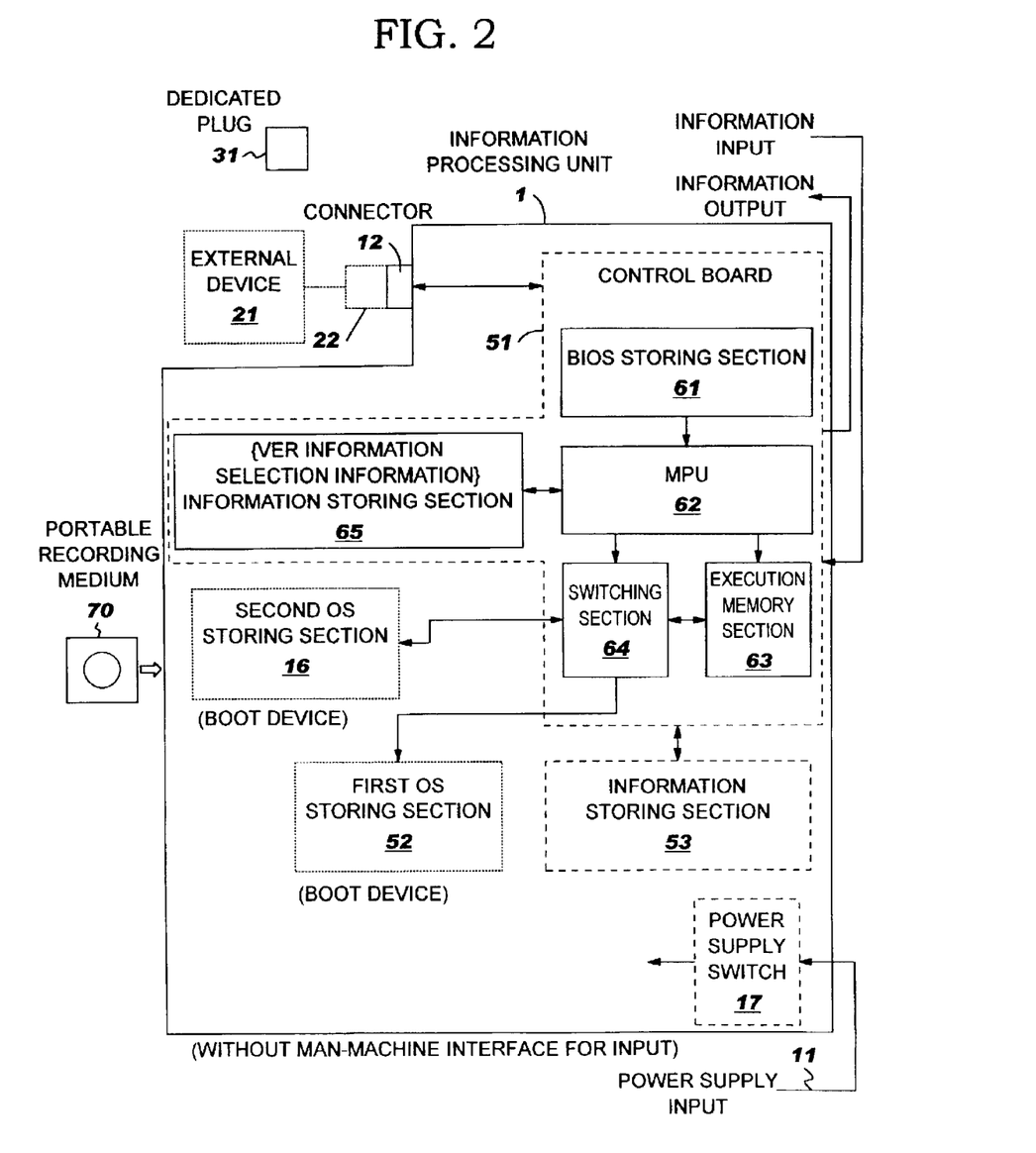
FIG. 2 is a block diagram of the internal configuration of the information processing unit shown in FIG. 1.

FIG. 2 is a block diagram of the internal configuration of the information processing unit 1 shown in FIG. 1.

The information processing unit 1 includes a control board 51 having main electronic elements thereon, a first OS storing section 52 comprised of a nonvolatile, re-writable memory device such as a flash ROM and storing a first OS to be booted for normal processing, and a information storing section 53 storing a large number of externally provided, unspecified information pieces. The control board 51 includes a BIOS storing section 61 storing Basic Input/Output System (BIOS) software for enabling memories and peripherals such as various input/output devices when the power supply is turned on, a microprocessor (MPU) 62 performing various operations and decisions, an execution memory section 63 for storing an OS and application software to perform various operations, a switching section 64 capable of switching the OS boot source between the first OS storing section 52 and the second OS storing section 16 in response to an instruction from the microprocessor 62, and an information storing section 65 storing version information of the first OS, and selecting information used to select software and data to be stored in the first OS storing section 52 from a different OS.

The second OS storing section 16 has a portable recording medium 70 such as a floppy disk inserted therein at the time of special processing such as upgrading the OS, and the second OS stored therein is read out. The processing steps for switching from the boot device for the first OS to the boot device for the second OS are set in software (BIOS) stored in the BIOS storing section 61.

When the information processing unit 1 according to the embodiment is connected to the Internet, for example, to store a large number of unspecified data pieces, information (data) input from the Internet is stored in the information storing section 53 through the control board 51, and the data stored in the information storing section 53 is output to the Internet through the control board 51.

FIG. 3 is a diagram of an example of internal wiring or interconnections in the dedicated plug 31 referenced in FIG. 1.

The dedicated plug 31 short-circuits, for example a port P14, serving as an output port and a port P11, serving as an input port, also an output port P16 and an input port P12, and an output port P17 and input port P13.

When the dedicated plug 31 is connected to a printer connector 12, and specific data pieces PD14, PD16, and PD17 are output to the output ports P14, P16, and P17, when the power supply is turned on, data pieces PD11, PD12, and PD13 input to the input ports P11, P12, and P13 are the same as the specific data pieces PD14, PD16, and PD17.

In the above case, the MPU 62 of FIG. 2: causes the specific data pieces PD14, PD16, and PD17 to be output from the ports P14, P16, and P17; monitors the input data at the ports P11, P12, and P13; and, then instructs the switching section 64 to boot an OS from either the second OS storing section 16 or the first OS storing section 52 depending upon whether or not the specific data pieces PD14, PD16, and PD17 are returned directly to the ports P11, P12, and P13.

The specific data pieces PD14, PD16, and PD17 are verification signals used to switch the boot source and have a form different and distinguishable from the other signals input to the ports P11, P12, and P13 at the time of normal processing. The signal form may be arbitrary unless the form could cause an error in distinguishing due to noise. For example, it may be a simple 4-bit signal as far as it is distinguished from the other signals and is not generated by noise. If the signal is not distinguishable enough or an error is likely to be caused by noise, the number of bits of the verification signal may be increased, the number of ports may be increased, or a plurality of signals may be used on the time series.

Operations by a authorized operator in terms of security and by the information processing unit 1 according to the embodiment will be next described.

Figure 4:
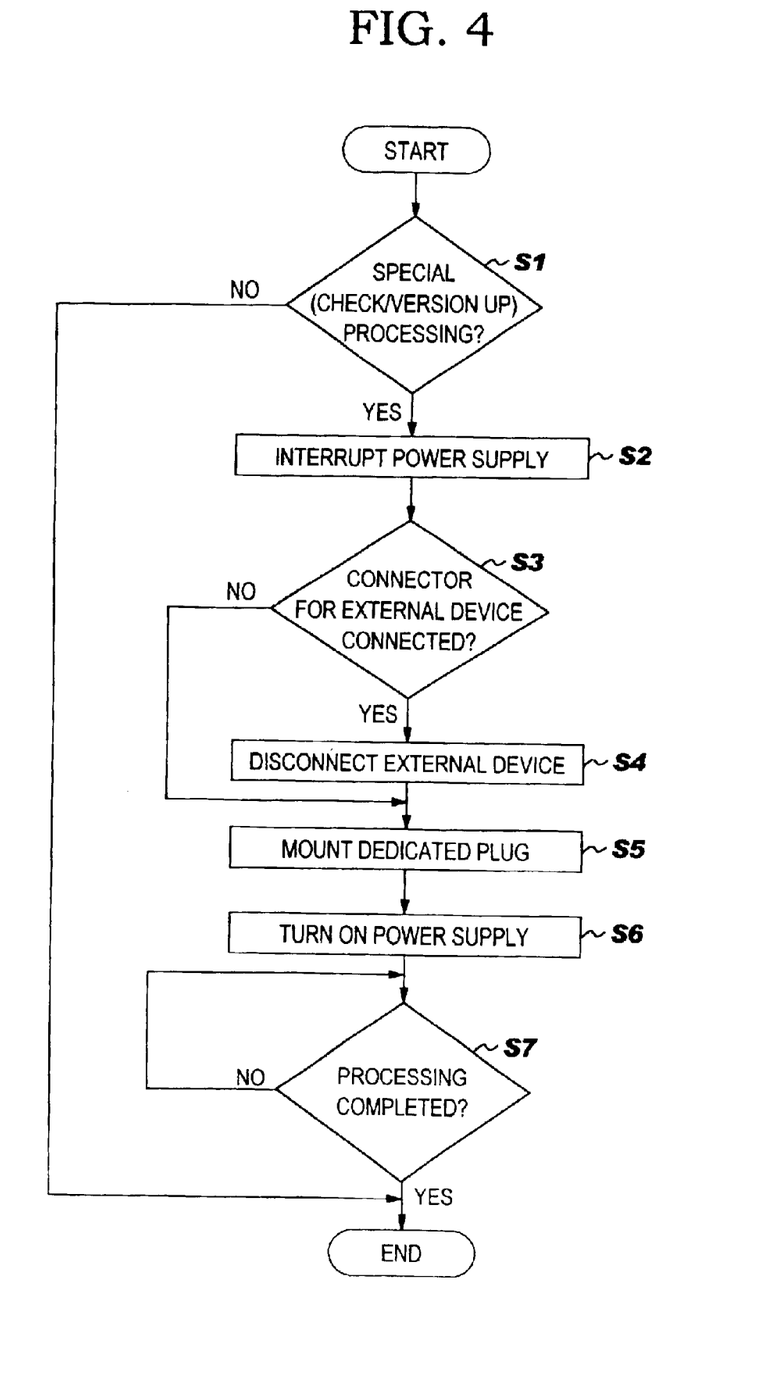
FIG. 4 is a flow chart illustrating the operation by the authorized operator of the information processing unit according to an embodiment of the present invention.

FIG. 4 is a flow chart illustrating the operation by the authorized operator of the information processing unit 1 according to the embodiment of the present invention.

The authorized operator first determines whether or not a special processing such as checking, recovery or "versioning up" (upgrading), which cannot be performed by an OS booted for normal processing, should be performed by booting a different OS (step S1). If the special processing should be done (YES in step S1), the power supply switch 17 is turned off to interrupt power supply to the information processing unit 1 (step S2). Otherwise (NO in step S1), the operation ends.

The authorized operator then determines whether or not the printer connector 12 is connected to the printer 21 which is an external device (step S3). If the printer 21 is connected to the printer connector 12 (YES in step S3), the printer 21 is disconnected from the printer connector 12 (step S4), and then the dedicated plug 31 is attached to the printer connector 12 (step S5). If the printer 21 is not connected to the printer connector 12 (NO in step S3), the dedicated plug 31 is immediately attached to the printer connector 12 (step S5).

In the present embodiment, the second OS storing section 16 includes a floppy disk drive into which a portable recording medium (floppy disk) can be inserted and, therefore, a floppy disk storing an OS is inserted in the second OS storing section 16 before initiating the next step S6.

After the dedicated plug 31 is attached to the printer connector 12, the authorized operator turns on the power supply switch 17 to power on the information processing unit 1 (step S6).

At this point, the switching section 64 operates in response to an instruction from the MPU 62 to switch the OS boot source at the time of powering on from the normal first OS storing section 52 to the second OS storing section 16.

The authorized operator determines whether or not the processing in the information processing unit 1 has been completed based on the content displayed at the display window 15 or the elapse of a predetermined time period necessary for booting an OS (step S7). If the processing in the information processing unit 1 has been completed (YES in step S7), the authorized operator finishes his/her operation. On the other hand, if the processing in the information processing unit 1 has not been completed (NO in step S7), the authorized operator waits until the processing in the information processing unit 1 is completed.

Figure 5:
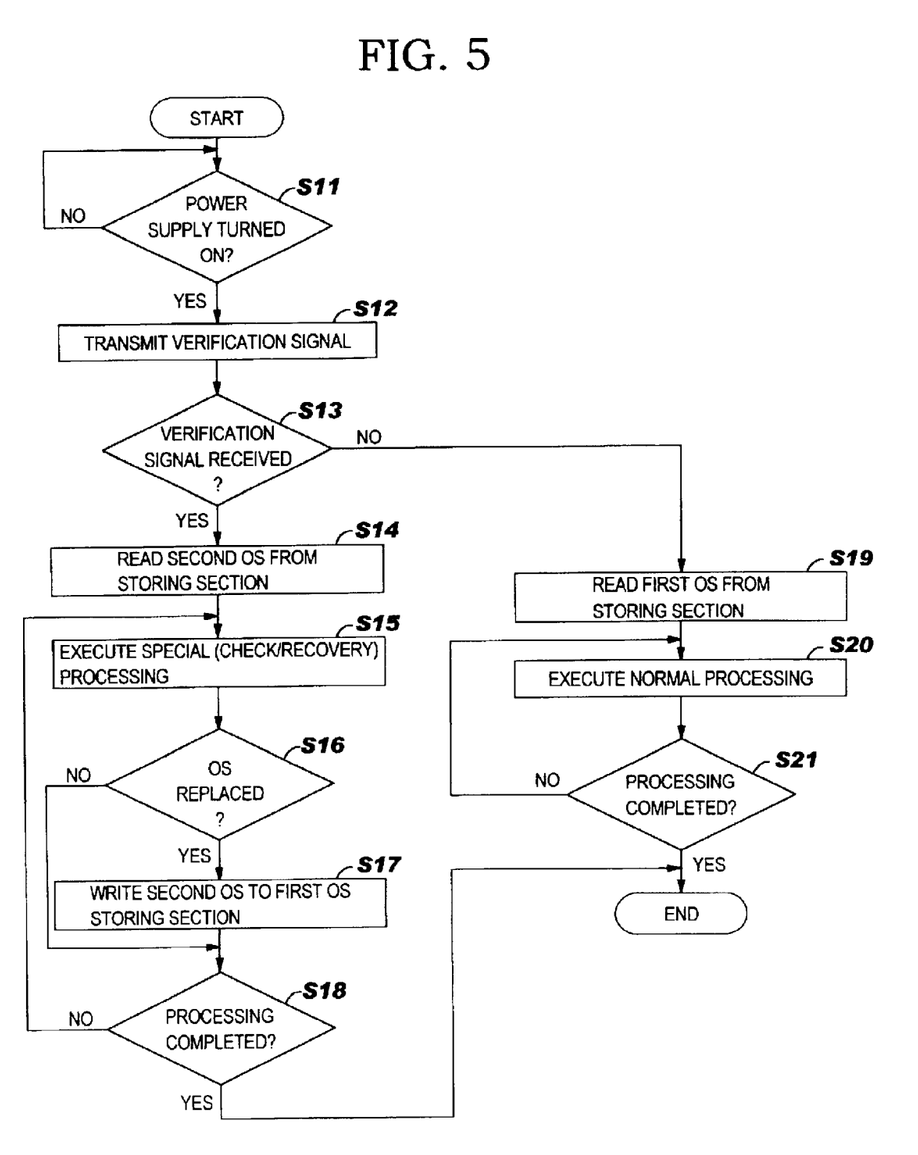
FIG. 5 is a flow chart illustrating the processing operation in the information processing unit according to an embodiment of the present invention.

FIG. 5 is a flow chart illustrating the processing operation in the information processing unit 1 according to the embodiment.

In the information processing unit 1, it is determined whether or not the power supply switch 17 is turned on by the authorized operator to power on the information processing unit 1 in the step S6 in FIG. 4 (step S11). If the power supply is turned on (YES in step S11), the MPU 62 transmits verification signals PD14, PD16, and PD17 to the output ports P14, P16, and P17 of the printer connector 12 (step S12). If the power supply is not turned on (NO in step S11), the information processing unit 1 again performs the determination in step S11.

The MPU 62 then determines whether or not the signals PD11, PD12, and PD13 input to the input ports P11, P12, and P13 of the printer connector 12 match the verification signals PD14, PD16, and PD17. In other words, the MPU determines whether or not the verification signals PD14, PD16, and PD17 are directly returned to the input ports P11, P12, and P13 and received (step S13). The determination result in step S13 depends on whether or not the dedicated plug 31 for short-circuiting the output ports P14, P16, and P17 and the input ports P11, P12, and P13, respectively, is plugged in the printer connector 12. If the verification signals PD14, PD16, and PD17 are received at the input ports P11, P12, and P13 (YES in step S13), the MPU 62 outputs an instruction to the switching section 64, which switches the OS boot source to the second OS storing section 16 and then reads the second OS (step S14).

The special processing enabled by the OS read out from the second OS storing section 16 such as checking and recovery for the OS stored in the first OS storing section 52 is executed (step S15). Then, the MPU 62 compares the version information of the OS stored in the first OS storing section 52, which has been read out from the information storing section 65, and the version information of the OS read out from the second OS storing section 16, and determines whether or not the OS stored in the first OS storing section 52 should be replaced (step S16). If the version information of the OS in the first OS storing section 52 matches the version information of the OS in the second OS storing section 16, the OS replacement is not necessary for upgrading the version (NO in step S16). Therefore, control proceeds to step S18. If the version information of the OS in the first OS storing section 52 is older than the version information of the OS in the second OS storing section 16, the OS is replaced (YES in step S16), and therefore the OS read out from the second OS storing section 16 is written in the first OS storing section 52 (step S17). Note that, at that time, necessary contents from the OS are selectively written based on the selecting information read out from the information storing section 65.

Thereafter, the MPU 62 determines whether or not the processing in the information processing unit 1 enabled by the OS read out from the second OS storing section 16 has been completed (step S18). If the processing in the information processing unit 1 has been completed (YES in step S18), a character or symbol string indicating the completion is displayed at the display window 15 to notify the authorized operator of the completion, thus ending the operation. On the other hand, if the processing in the information processing unit 1 has not been completed (NO in step S18), control returns to step S15, and the special processing is again executed.

In step S13, if the verification signals PD14, PD16, and PD17 are not received at the input ports (NO in step S13), which indicates a normal processing state, the OS is read out from the first OS storing section 52 (step S19). Then, the information processing unit 1 executes a normal processing enabled by the OS read out from the first OS storing section 52 (step S20).

Thereafter, similarly to step S18, the MPU 62 determines whether or not the processing in the information processing unit 1 enabled by the OS read out from the first OS storing section 52 has been completed (step S21). If the processing has been completed (YES in step S21), a character or symbol string indicating the completion is displayed at the display window 15 to notify the authorized operator of the completion, thus ending the operation. If the processing in the information processing unit 1 has not been completed (NO in step S21), control returns to step S20 and the normal processing is again executed.

The processing steps in the above described steps S11 to S21 are, for example, stored (set) as software in the BIOS storing section 61 in the information processing unit 1 and each executed by the MPU 62.

Thus, according to the present embodiment, the dedicated plug 31 is attached to the connector 12 to switch the OS boot source at the time of powering on from the first OS storing section 52 within the main body of the information processing unit 1 to the second OS storing section 16. Therefore, a maintenance worker as a authorized operator in terms of security management needs only to carry a floppy disk or portable recording medium and the dedicated plug 31, and does not have to carry a rather bulky device such as a note type PC or the like.

Even if, for example, a general-purpose OS is used for reducing the cost and therefore a floppy disk storing such an OS is readily available, the dedicated plug 31 serving as a key for switching the boot source to the floppy disk drive is not available to general users of the information processing unit 1, and therefore the security management can be further reinforced.

Therefore, according to the embodiment, in an information processing unit with no input device, the security management can strictly be implemented while the workload of the maintenance worker for switching between boot devices to boot a different OS can be alleviated.

In the information processing unit 1 according to the first embodiment, the second OS storing section 16 is integrated therein as a floppy disk drive. However, it is possible to adopt other means for storing the second OS to allow the information processing unit with no input device to boot the OS for the special processing.

For example, in place of the floppy disk drive in the first embodiment, a drive for a portable information storage such as a portable magnetic recording disk, an optical disk, or a magneto-optical disk, may be used.

More specifically, a CD (Compact disk) ROM drive, a DVD (Digital Versatile disk) ROM drive, an MO (Magneto-Optical disk) drive, an MD (Mini disk) drive, or a removable hard disk drive may be used.

Also, in place of integrating the second OS storing section such as a floppy disk drive in the information processing unit 1, only a connector or a slot may be provided for the information processing unit through which a second OS storing section is connected to the information processing unit. This can be applied when the storing medium is a non-rotating device memory such as a memory stick or a memory card, or when the storing medium is in a compact and integral form including a drive and can be connected through a connector even though it rotates. This is shown in FIG. 6 as a second embodiment.

Figure 6:
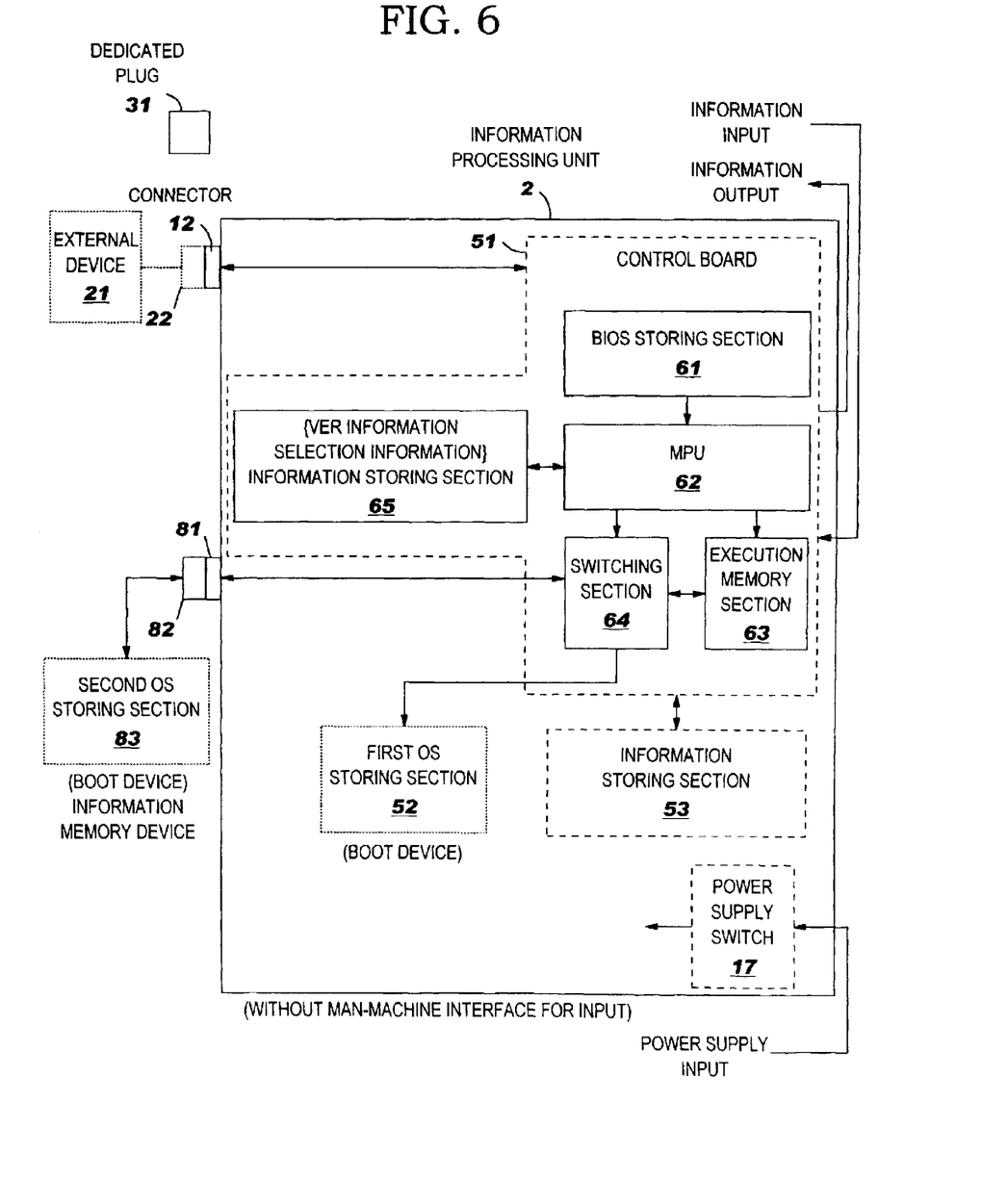
FIG. 6 is a block diagram of the internal configuration of an information processing unit according to a second embodiment of the present invention.

FIG. 6 is a block diagram of the internal configuration of an information processing unit according to a second embodiment of the present invention.

Unlike the information processing unit 1 in FIG. 2, the information processing unit 2 in FIG. 6 has a connector 81 and it does not integrate a second OS storing section 83 therein. The second OS storing section 83 is externally connected to the information processing unit 2 by the connector 81 and a connection plug 82. As described above, the second OS storing section 83 may be a device memory or a combination of a storing medium and a drive in a compact form.

According to the second embodiment, before the power supply is turned on in step S6 in the flowchart of FIG. 4, the maintenance worker must connect the plug 82 to the connector 81 instead of inserting a floppy disk into the second OS storing section 16 in the first embodiment. The other steps are the same.

According to the second embodiment, even if the capacity of the second OS is greater than the capacity of a floppy disk (1.5 MB, for example), a storage medium having a capacity greater than 1.5 MB (such as a memory stick) can be used with the same connector or slot, so that increased flexibility is achieved for the storage capacity for storing the second OS.

Furthermore, according to the embodiments described above, the maintenance worker carries a storage medium storing the second OS to the location of the information processing unit, while the second OS may be booted, for example, through a communication network. This case is shown in FIG. 7 as a third embodiment.

Figure 7:
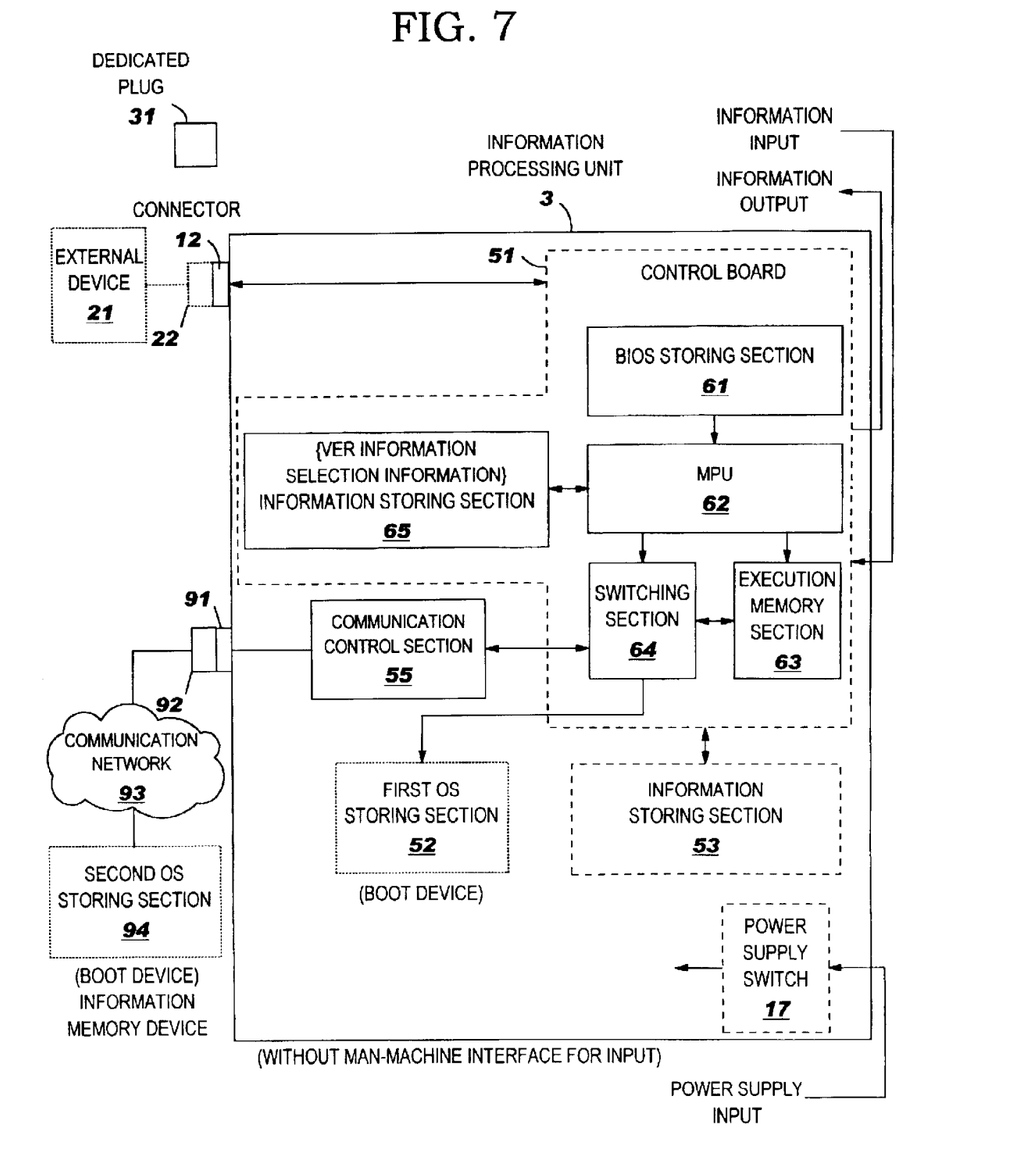
FIG. 7 is a block diagram of the internal configuration of an information processing unit according to a third embodiment of the present invention.

FIG. 7 is a block diagram of the internal configuration of an information processing unit according to a third embodiment of the present invention.

Unlike the information processing units 1 and 2 in FIGS. 2 and 6, an information processing unit 3 in FIG. 7 does not have a second OS storing section inside or in its vicinity, but is provided with a communication control section 55 enabling communication with the outside, and a communication connector 91 serving as an input/output terminal for the communication control section 55. A second OS storing section 94 is connected through a communication network 93 such as a telephone network or the like connected to the information processing unit 3 by the communication connector 91 and communication connection plug 92. The second OS storing section 94 may be an arbitrary information storage and includes a communication control section which is not shown.

According to the third embodiment, the maintenance worker must connect the communication connection plug 92 to the communication connector 91 during the period from attaching the dedicated plug in step S5 to the powering on in step S6 in the flowchart in FIG. 4, in place of inserting a floppy disk into the second OS storing section 16 in the first embodiment, and must communicate with the second OS storing section during the period from the reception of the verification signal in step S13 to the reading from the second OS storing section in step S14 in the flowchart of FIG. 5. By incorporation of the previously mentioned processing steps for the explained embodiments, the remaining processing steps are essentially the same.

In the third embodiment, the maintenance worker does not have to carry any storage medium storing the second OS to the location of the information processing unit. Therefore, unexpected situations that, for example, a floppy disk is damaged while the maintenance worker moves from one place to another carrying it, a floppy disk is found to be defective, or data in a floppy disk could not be updated promptly enough to catch up with sudden version up, may not occur, so that the operability for the maintenance worker improves and the OS stored in the information processing unit can easily be upgraded to the latest version.

While the information processing unit is connected to the Internet and stores a large number of unspecified data pieces in the embodiments described above, the present invention is not limited thereto and is applicable to any information processing unit which is not equipped with a human machine interface for inputting such as a keyboard but includes an external device connector which is not used for booting an OS.

Also, in the embodiments described above, a printer connector is used as an external device connector, but the present invention is not limited thereto and may use, as the external device connector, another connector such as the uninterruptible power supply connector 13 or the information input/output connector shown in FIG. 1.

Furthermore, while there are three internal interconnections in the dedicated plug 31 in the embodiments described above, the number of interconnections may be any number equal to or greater than one as long as they can be distinguished from other signals and there is no possibility of distinguishing error due to noise. Similarly, the verification signal may be in the form of a simple signal of several bits as long as it can be distinguished from other signals and there is no possibility of distinguishing error due to noise. To make the signal distinguishable or to cope with noise, the number of bits may be increased.

Advantageously, the present invention, in an information processing unit with no input device, the OS boot source at the time of powering on can be changed from the first OS storing section to the second OS storing section by attaching a dedicated plug to a connector. Therefore, the workload of the maintenance worker in switching between the boot devices for booting a different OS can be alleviated, and the use of the dedicated plug unavailable to general users of the information processing unit can reinforce security management.

Also, the present invention can use a storage medium having a greater capacity with the same connector or slot, so that increased flexibility can be achieved for the storage capacity for storing the second OS.

Further, according to the present invention, the maintenance worker does not have to carry a storage medium storing a second OS to the location of the information processing unit, so that the operability for the maintenance worker can be improved and the OS stored in the information processing unit can easily be upgraded to the latest version.

In addition, the special processing executed by booting a different OS in the embodiments described above is not limited to the check/recovery/" versioning up (upgrading), and the invention may be applied to any processing related to various kinds of operations performed by the maintenance worker.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for switching between a plurality of boot devices in an information processing unit provided with an external device connector including at least one output port and at least one input port, in which an operating system (OS) is booted from a first boot device for normal operation or is booted from a second boot device for a special operation, said method comprising:
   outputting a verification signal from said output port at the time of powering on or restarting said information processing unit;
   determining whether or not said verification signal is input to said input port;
   switching an OS boot source to said second boot device when said verification signal is input to said input port; and
   switching the OS boot source to said first boot device when said verification signal is not input to said input port.

2. The method according to claim 1, wherein a determination result in said determination step varies based on whether or not a dedicated plug for short-circuiting said output port and said input port is inserted in said connector.

3. The method according to claim 1, wherein said second boot device is integrated in the main body of said information processing unit.

4. The method according to claim 3, wherein said second boot device can read data from a portable recording medium.

5. The method according to claim 1, wherein said second boot device is a portable information storage connectable with a connector.

6. The method according to claim 2, wherein said second boot device is a portable information storage connectable with a connector, and said second boot device is integrated in the main body of said information processing unit.

7. The method according to claim 1, wherein said second boot device is an information storage connected through a communications line.

8. The method according to claim 1, wherein said verification signal is in a form different from a signal input to said input port in normal processing.

9. The method according to claim 6, wherein said verification signal is in a form different from a signal input to said input port in normal processing.

10. The method according to claim 1, further comprising the steps of:
    comparing the version of the OS stored in said first boot device with the version of the OS booted from said second boot device after the OS boot source is switched to said second boot device, and
    writing the OS booted from said second boot device into said first boot device, when the version of the OS booted from said second boot device is newer that the version of the OS stored in said first boot device.

11. The method according to claim 10, further comprising the step of selecting, from the OS booted from said second boot device, only software contents necessary for performing normal processing in said information processing unit, said selected software contents being written in said step of writing the OS booted from said second boot device into said first boot device.

12. The method according to claim 1, wherein each step for switching between said first and second boot devices is set in basic input/output system (BIOS).

13. The method according to claim 1, further comprising the steps of:
    comparing the version of the OS stored in said first boot device with the version of the OS booted from said second boot device after the OS boot source is switched to said second boot device,
    writing the OS booted from said second boot device into said first boot device, when the version of the OS booted from said second boot device is newer than the version of the OS stored in said first boot device, and
    selecting, from the OS booted from said second boot device, only software contents necessary for performing normal processing in said information processing unit, said selected software contents being written in said step of writing the OS booted from said second boot device into said first boot device,
    wherein a determination result in said determination step varies based on whether or not dedicated plug for short-circuiting said output port and said input port is inserted in said connector, a said second boot device is integrated in the main body of said information processing unit, said device can read data from a portable recording medium, said second boot device is a portable information storage connectable with a connector and is integrated in the main body of said information processing unit, and said verification signal is in a form different from a signal input to said input port in normal processing.

14. The method according to claim 13, wherein said second boot device includes a compact disc (CD).

15. A system for switching between boot devices in an information processing unit, comprising a plug attachable to an external device connector provided in the information processing unit; and a plurality of input/output pins used as a key device for determining whether to boot an OS from a first boot device for normal operation or from a second boot device for a special operation at the time of power on, wherein the OS boot source is switched from the first boot device to the second boot device by directly connecting at least one output of said plug with at least one input thereof.

16. The system according to claim 15, wherein security management for said OS is implemented based on the presence/absence of said plug, the presence/absence of data in said second boot device or the presence/absence of the second boot device itself.

17. The system according to claim 16, wherein said second boot device includes a compact disc (CD).

* * * * *